US008120639B2

(12) United States Patent
Barry et al.

(10) Patent No.: US 8,120,639 B2
(45) Date of Patent: Feb. 21, 2012

(54) HIGH-DEFINITION VIDEO CONFERENCE SYSTEM AND METHOD

(75) Inventors: Lam Barry, Tao Yuan Shien (TW); Leung Chee-Chun, Tao Yuan Shien (TW); Chang Chia-Yuan, Taichung (TW); Hsu Hsueh-Cheng, Tao Yuan Shien (TW)

(73) Assignee: Quanta Computer Inc. (TW)

( * ) Notice: Subject to any disclaimer, the term of this patent is extended or adjusted under 35 U.S.C. 154(b) by 1126 days.

(21) Appl. No.: 11/984,729

(22) Filed: Nov. 21, 2007

(65) Prior Publication Data

US 2008/0309751 A1 Dec. 18, 2008

(30) Foreign Application Priority Data

Jun. 12, 2007 (TW) .............................. 96121123 A

(51) Int. Cl.
*H04N 7/14* (2006.01)
(52) U.S. Cl. .................................. 348/14.08; 348/14.09
(58) Field of Classification Search .................. 709/204, 709/207, 219, 227, 230, 231; 370/259; 348/14.08, 348/14.09
See application file for complete search history.

(56) References Cited

U.S. PATENT DOCUMENTS

| 7,631,039 B2 * | 12/2009 | Eisenberg | ..................... 370/259 |
| 2002/0118809 A1 | 8/2002 | Eisenberg | |
| 2007/0081522 A1 | 4/2007 | Apelbaum | |

FOREIGN PATENT DOCUMENTS

TW 200616454 5/2006

OTHER PUBLICATIONS

Office Action in related Taiwan Application No. 096121123.
English translation of Taiwan Office Action from related Taiwan Application No. 096121123).

* cited by examiner

*Primary Examiner* — Suhan Ni
(74) *Attorney, Agent, or Firm* — Thomas, Kayden, Horstemeyer & Risley, LLP.

(57) ABSTRACT

The invention provides a high-definition video conference system and method. The high-definition video conference system, according to the invention, uses an encoding module for compressing a plurality of usable digital signals under a high-definition compression standard into a plurality of compressed digital signals, and an instant-messaging application for transmitting the compressed digitals to a second terminal apparatus. The second terminal apparatus uses a decoding module for decompressing the plurality of compressed digital signals under the high-definition compression standard to obtain a plurality of image signals, and a displaying module for displaying the image signals. Therefore, the high-definition video conference system of the invention can achieve high-definition video conference applications even under limited hardware performance and network transmission bandwidth.

21 Claims, 2 Drawing Sheets

HIGH-DEFINITION VIDEO CONFERENCE SYSTEM AND METHOD

BACKGROUND OF THE INVENTION

1. Field of the Invention

Figure 1:
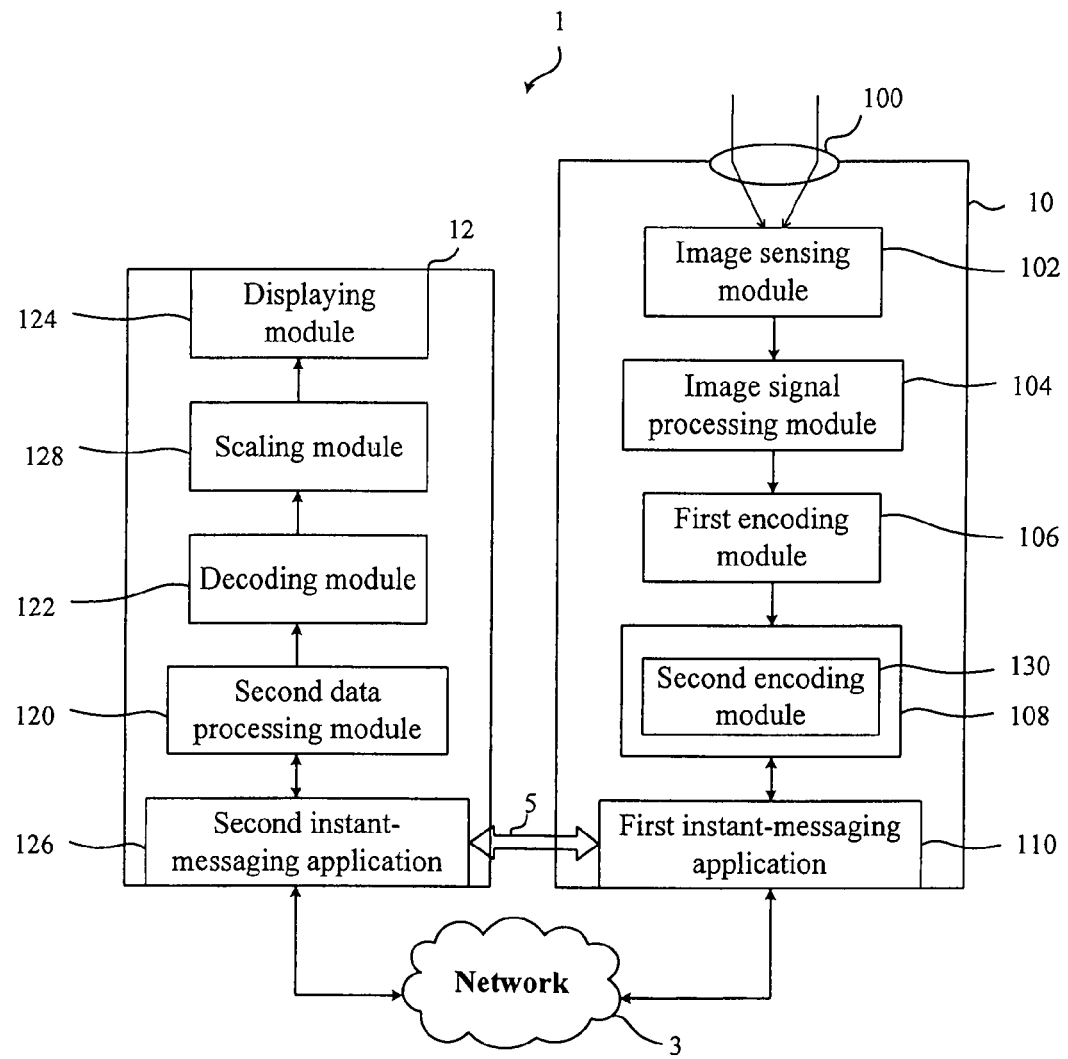

The invention relates to a video conference system and method and, more particularly, to a high-definition video conference system and method.

2. Description of the Prior Art

Recently, because of the development of network technology, video conference has become an important tool for remotely communicating with each other. However, since the video conference is restricted to hardware performance and network transmission bandwidth, the image is always displayed with bad quality.

Because the amount of high-definition digital image signal data is very large, it would be a very heavy load for computer system and communication network on transmission and process. Therefore, the instant messengers in common use, such as MSN messenger, Yahoo messenger, Skype, Google Talk, and iChat, usually limit the definition of image transmission to achieve the efficacy of real-time receiving and transmitting messages. Consequently, the instant messengers usually can not achieve high-definition video conferencing applications.

Accordingly, the main scope of the invention is to provide a high-definition video conference system and method to solve the aforesaid problems.

SUMMARY OF THE INVENTION

A scope of the invention is to provide a high-definition video conference system and method, which compresses a plurality of usable digital signals under a high-definition compression standard into a plurality of compressed digital signals through an encoding module of a first terminal apparatus, and then transmits those compressed digital signals to a second terminal apparatus via an instant-messaging application. The second terminal apparatus decompresses those compressed digital signals under the high-definition compression standard through a decoding module to obtain a plurality of image signals, and displays those image signals through a displaying module.

Because the data amount of those compressed digital signals compressed by the encoding module is much smaller than that of those usable digital signals without compression, the load of follow-up transmission and process can be reduced a lot. Accordingly, the high-definition video conference system of the invention can achieve high-definition video conferencing applications even under limited hardware performance and network transmission bandwidth.

A high-definition video conference system according to an embodiment of the invention comprises a first terminal apparatus and a second terminal apparatus. The first terminal apparatus comprises an image sensing module, an image signal processing module, an encoding module and a data processing module. The second terminal apparatus comprises a second data processing module, a decoding module and a displaying module.

The image sensing module is used for sensing an image to generate a plurality of raw digital signals. The image signal processing module is coupled to the image sensing module and used for processing those raw digital signals into a plurality of usable digital signals. The encoding module is coupled to the image signal processing module and used for compressing those usable digital signals under a high-definition compression standard into a plurality of compressed digital signals. The first data processing module is coupled to the encoding module and used for executing a first instant-messaging application and transmitting those compressed digital signals via the first instant-messaging application.

The second data processing module is used for executing a second instant-messaging application, wherein the first instant-messaging application communicates with the second instant-messaging application through a network to establish a communication link over a wideband communication channel. The second data processing module receives those compressed digital signals via the second instant-messaging application through the wideband communication channel. The decoding module is coupled to the second data processing module and used for decompressing those compressed digital signals under the high-definition compression standard to obtain a plurality of image signals. The displaying module is coupled to the decoding module and used for displaying those image signals.

A high-definition video conference method according to an embodiment of the invention comprises the following steps. First, at the first terminal, an image is sensed to generate a plurality of raw digital signals. Then, at the first terminal, those raw digital signals are processed into a plurality of usable digital signals. Afterward, at the first terminal, those usable digital signals are compressed under a high-definition compression standard into a plurality of compressed digital signals. At the first terminal, a first instant-messaging application is then executed and those compressed digital signals are transmitted via the first instant-messaging application.

Afterward, a second instant-messaging application is executed at a second terminal, wherein the first instant-messaging application communicates with the second instant-messaging application through a network to establish a communication link over a wideband communication channel. Then, at the second terminal, those compressed digital signals are received via the second instant-messaging application through the wideband communication channel. At the second terminal, those compressed digital signals are then decompressed under the high-definition compression standard to obtain a plurality of image signals. Finally, those image signals are displayed at the second terminal.

Therefore, according to the high-definition video conference system and method of the invention, it compresses a plurality of usable digital signals into a plurality of compressed digital signals based on a high-definition compression standard via an encoding module of a first terminal apparatus, and then transmits those compressed digital signals to a second terminal apparatus via an instant-messaging application. The second terminal apparatus decompresses those compressed digital signals under the high-definition compression standard via a decoding module to obtain a plurality of image signals and then displays those image signals via a displaying module. Because the data amount of those compressed digital signals compressed by the encoding module is much smaller than that of those usable digital signals without compression, the load of follow-up transmission and process can be reduced a lot. Accordingly, the high-definition video conference system and method of the invention can achieve high-definition video conferencing applications even under limited hardware performance and network transmission bandwidth.

The advantage and spirit of the invention may be understood by the following recitations together with the appended drawings.

BRIEF DESCRIPTION OF THE APPENDED DRAWINGS

Figure 2:
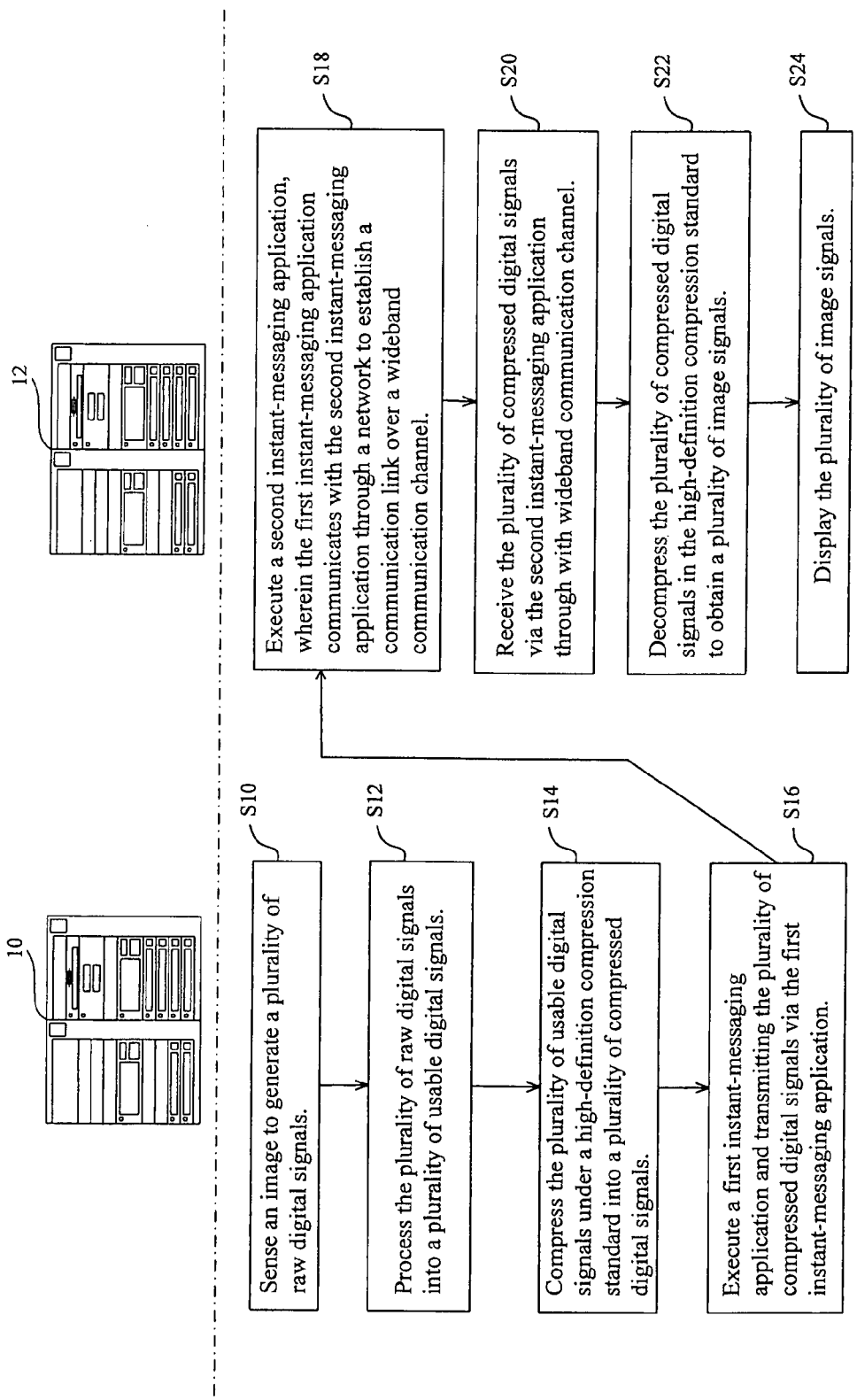

FIG. 1 is a functional block diagram illustrating a high-definition video conference system according to an embodiment of the invention; and FIG. 2 is a flow chart showing a high-definition video conference method according to an embodiment of the invention.

DETAILED DESCRIPTION OF THE INVENTION

The invention is to provide a high-definition video conference system and method which compress a plurality of usable digital signals into a plurality of compressed digital signals based on a high-definition compression standard via an encoding module of a first terminal apparatus, and then transmits those compressed digital signals to a second terminal apparatus via an instant-messaging application. The second terminal apparatus decompresses those compressed digital signals under the high-definition compression standard via a decoding module to obtain a plurality of image signals and displays those image signals via a displaying module. Because the data amount of those compressed digital signals compressed by the encoding module is much smaller than that of those usable digital signals without compression, the load of follow-up transmission and process can be reduced a lot. Accordingly, the high-definition video conference system and method of the invention can achieve high-definition video conferencing applications even under limited hardware performance and network transmission bandwidth.

Please refer to FIG. 1. FIG. 1 is a functional block diagram illustrating a high-definition video conference system 1 according to an embodiment of the invention. As shown in FIG. 1, the high-definition conference system 1 comprises a first terminal apparatus 10 and a second terminal apparatus 12. The first terminal apparatus 10 comprises a lens 100, an image sensing module 102, an image signal processing module 104, a first encoding module 106 and a first data processing module 108. The second terminal apparatus 12 comprises a second data processing module 120, a decoding module 122 and a displaying module 124.

In an embodiment, the first data processing module 108 can be a computer, and the first encoding module 106 is embedded in the computer. In another embodiment, the first data processing module 108 can be a computer and the lens 100, the image sensing module 102, the image signal processing module 104 and the first encoding module 106 can be coupled to a digital imaging/processing device (e.g. webcam) of the computer.

The lens 100 is used for projecting an image to the image sensing module 102. The image sensing module is used for sensing the image to generate a plurality of raw digital signals. In practical applications, the image sensing module 102 can be, but not limited to, a complementary metal-oxide semiconductor (CMOS) sensor or a charge coupled device (CCD) sensor.

The image signal processing module 104 is coupled to the image sensing module 102 and used for processing those raw digital signals into a plurality of usable digital signals. In practical applications, the image signal processing module 104 can be, but not limited to, an image signal processor (ISP).

The first encoding module 106 is coupled to the image signal processing module 104 and used for compressing those usable digital signals into a plurality of compressed digital signals based on a high-definition compression standard. In practical applications, the high-definition compression standard can be, but not limited to, an H.264 standard, and the first encoding module 106 can be, but not limited to, an H.264 encoder. Furthermore, the first encoding module 106 may further comprise a codec, such as an H.264 codec. It should be noticed that the data amount of those compressed digital signals compressed by the first encoding module 106 is much smaller than that of those usable digital signals without compression, so the load of follow-up transmission and process can be reduced a lot.

The first data processing module 108 is coupled to the first encoding module 106 and used for executing a first instant-messaging application 110 and transmitting those compressed digital signals via the first instant-messaging application 110. In practical applications, the first instant-messaging application can be AOL Instant Messenger (AIM), Microsoft MSN Messenger, Yahoo! Messenger, ICQ, Jabber, Groove, Sun JXTA, or the like.

The second data processing module 120 is used for executing a second instant-messaging application 126, wherein the first instant-messaging application 110 communicates with the second instant-messaging application 126 through a network 3 to establish a communication link over a wideband communication channel 5. In practical applications, the second instant-messaging application 126 can be AOL Instant Messenger (AIM), Microsoft MSN Messenger, Yahoo! Messenger, ICQ, Jabber, Groove, Sun JXTA, or the like.

In practical applications, the network 3 can be a local area network, an Intranet, an Internet, a radio telecommunication network, a public switched telephone network (PSTN), or the like.

In practical applications, the first instant-messaging application 110 can communicate with the second instant-messaging application 126 via an instant-messaging server (not shown in FIG. 1) through the network 3. For example, if both the first instant-messaging application 110 and the second instant-messaging application 126 are Microsoft MSN Messengers and the instant-messaging server is Microsoft MSN server, the first instant-messaging application 110 and the second instant-messaging application 126 will respectively establish a communication link for communicating with the instant-messaging server through the network 3. Accordingly, the first instant-messaging application 110 can communicate with the second instant-messaging application 126 via the instant-messaging server.

In practical applications, the first instant-messaging application 110 and the second instant-messaging application 126 may respectively possess an instant-messaging plus for assisting in establishing the communication link over the wideband communication channel 5. It should be noticed that the wideband communication channel 5 can be a special wideband communication channel for transmitting those compressed digital signals.

The second data processing module 120 receives those compressed digital signals via the second instant-messaging application 126 through the wideband communication channel 5. The decoding module 122 is coupled to the second data processing module 120 and used for decompressing those compressed digital signals under the high-definition compression standard to obtain a plurality of image signals. The displaying module 124 is coupled to the decoding module 122 and used for displaying those image signals. In practical applications, the decoding module 122 can be implemented in, but not limited to, software or hardware. Besides, in another embodiment, the first encoding module 106 can be an MJPEG encoder or an MJPEG codec. Furthermore, the first data processing module 108 comprises a second encoding module 130 which can be an H.264 encoder or an H.264 codec. In another embodiment, after receiving a plurality of usable digital signals, the first encoding module 106 compresses those usable digital signals into a plurality of compressed digital signals in MJPEG based on MJPEG standard. It should be noticed that the data amount can be controlled in a range, such as bandwidth of USB, by adjusting the compression rate of those compressed digital signals in MJPEG, and the distortion will be reduced simultaneously. Then, after receiving those compressed digital signals in MJPEG, the second encoding module 130 transcodes those compressed digital signals in MJPEG into a plurality of compressed digital signals in H.264 based on H.264 standard. Afterward, the first data processing module 108 transmits those compressed digital signals in H.264 to the decoding module 122 via the first instant-messaging application 110, and the decoding module 122 decompresses those compressed digital signals in H.264 standard to obtain a plurality of image signals.

In practical applications, the second terminal apparatus may further comprise a scaling module 128 which is coupled between the decoding module 122 and the displaying module 124 and used for selectively scaling those image signals. Then, the displaying module 124 will display those image signals selectively scaled by the scaling module 128.

In practical applications, the first data processing module 108 can transmit data via the first instant-messaging application 110, and the second data processing module 120 can receive data via the second instant-messaging application 126 through the network 3. For example, the data can be, but not limited to, a document or an image. Accordingly, users of using the first instant-messaging application 110 and the second instant-messaging application 126 can communicate with each other by the data.

In practical applications, the first data processing module 108 also can transmit a plurality of audio signals via the first instant-messaging application 110, and the second data processing module 120 can receive those audio signals via the second instant-messaging application 126 through the network 3. Accordingly, users of using the first instant-messaging application 110 and the second instant-messaging application 126 can communicate with each other via those audio signals.

Accordingly, the high-definition video conference system and method of the invention can achieve high-definition video conferencing applications even under limited hardware performance and network transmission bandwidth.

Please refer to FIG. 2. FIG. 2 is a flow chart showing a high-definition video conference method according to an embodiment of the invention. In this embodiment, the first and second terminals 10, 12 are arranged as shown in FIG. 1. As shown in FIG. 2, step S10 is first performed to sense an image to generate a plurality of raw digital signals at the first terminal. Afterward, step S12 is performed to process those raw digital signals into a plurality of usable digital signals at the first terminal. Step S14 is then performed to compress those usable digital signals under a high-definition compression standard into a plurality of compressed digital signals at the first terminal. In practical applications, the high-definition compression standard can be, but not limited to, an H.264 standard. Step S16 is then performed to execute a first instant-messaging application and transmit those compressed digital signals via the first instant-messaging application at the first terminal. In practical applications, the first instant-messaging application can be AOL Instant Messenger (AIM), Microsoft MSN Messenger, Yahoo! Messenger, ICQ, Jabber, Groove, Sun JXTA, or the like.

Step S18 is then performed to execute a second instant-messaging application at the second terminal, wherein the first instant-messaging application communicates with the second instant-messaging application through a network to establish a communication link over a wideband communication channel. In practical applications, the second instant-messaging application can be AOL Instant Messenger (AIM), Microsoft MSN Messenger, Yahoo! Messenger, ICQ, Jabber, Groove, Sun JXTA, or the like. In practical applications, the network can be a local area network, an Intranet, an Internet, a radio telecommunication network, a public switched telephone network, or the like.

In practical applications, the first instant-messaging application can communicate with the second instant-messaging application via an instant-messaging server through a network. For example, if both the first instant-messaging application and the second instant-messaging application are Microsoft MSN Messengers and the instant-messaging server is Microsoft MSN server, the first instant-messaging application and the second instant-messaging application will respectively establish the communication link for communicating with the instant-messaging server through the network. Accordingly, the first instant-messaging application can communicate with the second instant-messaging application via the instant-messaging server.

Afterward, step S20 is performed to receive those compressed digital signals via the second instant-messaging application through the wideband communication channel at the second terminal. Step S22 is then performed to decompress those compressed digital signals under the high-definition compression standard to obtain a plurality of image signals at the second terminal. Finally, step S24 is performed to display those image signals at the second terminal.

Besides, in another embodiment, in the step S14, the first encoding module 106 compresses those usable digital signals into a plurality of compressed digital signals in MJPEG based on MJPEG standard. It should be noticed that the data amount can be controlled in a range, such as bandwidth of USB, by adjusting the compression rate of those compressed digital signals in MJPEG, and the distortion is reduced simultaneously. Furthermore, after the step S14, the second encoding module 130 transcodes those compressed digital signals in MJPEG into a plurality of compressed digital signals based on H.264 standard after receiving those compressed digital signals in MJPEG. Then, the first data processing module 108 transmits those compressed digital signals in H.264 to the decoding module 122 via the first instant-messaging application 110, and the decoding module 122 decompresses those compressed digital signals in H.264 standard to obtain a plurality of image signals.

In practical applications, between the step of decompressing the plurality of compressed digital signals and the step of displaying the plurality of image signals, the method of the invention may further comprise the step of selectively scaling those image signals.

In practical applications, at the first terminal, data can be transmitted via the first instant-messaging application, and at the second terminal, the data can be received via the second instant-messaging application through the network. For example, the data can be, but not limited to, a document or an image. Accordingly, users of using the first instant-messaging application and the second instant-messaging application can communicate with each other by the data.

In practical applications, at the first terminal, a plurality of audio signals also can be transmitted via the first instant-messaging application, and at the second terminal, the plurality of audio signals can be received via the second instant-messaging application through the network. Accordingly, users of using the first instant-messaging application and the second instant-messaging application can communicate with each other by those audio signals.

Compared with prior art, according to the aforesaid high-definition video conference system and method, the invention compresses a plurality of usable digital signals under a high-definition compression standard into a plurality of compressed digital signals through an encoding module of a first terminal apparatus, and transmits those compressed digital signals to a second terminal apparatus via an instant-messaging application. The second terminal apparatus decompresses those compressed digital signals under the high-definition compression standard through a decoding module to obtain a plurality of image signals, and displays those signals through a displaying module. Because the data amount of those compressed digital signals compressed by the encoding module is much smaller than those usable digital signals without compression, the load of follow-up transmission and process can be reduced a lot. Accordingly, the high-definition video conference system of the invention can achieve high-definition video conference applications even under limited hardware performance and network transmission bandwidth.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A high-definition video conference system, comprising:
    a first terminal apparatus, comprising:
        an image sensing module for sensing an image to generate a plurality of raw digital signals;
        an image signal processing module, coupled to the image sensing module, for processing the plurality of raw digital signals into a plurality of usable digital signals;
        a first encoding module, coupled to the image signal processing module, for compressing the plurality of usable digital signals into a plurality of first compressed digital signals based on a first high-definition compression standard; and
        a first data processing module, coupled to the first encoding module, for executing a first instant-messaging application, the first data processing module transmitting a plurality of second compressed digital signals via the first instant-messaging application,
            wherein the first data processing module comprises a second encoding module, coupled to the first encoding module, for compressing the plurality of first compressed digital signals into the plurality of second compressed digital signals based on a second high-definition compression standard; and
    a second terminal apparatus, comprising:
        a second data processing module for executing a second instant-messaging application, wherein the first instant-messaging application communicates with the second instant-messaging application through a network to establish a communication link over a wideband communication channel, the second data processing module receives the plurality of first compressed digital signals via the second instant-messaging application through the wideband communication channel;
        a decoding module, coupled to the second data processing module, for decompressing the plurality of second compressed digital signals under the second high-definition compression standard to obtain a plurality of image signals;
        and a displaying module, coupled to the decoding module, for displaying the plurality of image signals.

2. The high-definition video conference system of claim 1, wherein the high-definition compression standard is an H.264 standard.

3. The high-definition video conference system of claim 1, wherein the first high-definition compression standard is an MJPEG standard and the second high-definition compression standard is an H.264 standard.

4. The high-definition video conference system of claim 1, wherein the second terminal apparatus further comprises a scaling module, coupled between the decoding module and the displaying module, for selectively scaling the plurality of image signals; the displaying module displays the image signals selectively scaled by the scaling module.

5. The high-definition video conference system of claim 1, wherein the network is one selected from a group consisting of a local area network, an Intranet, an internet, a radio telecommunication network, and a public switched telephone network.

6. The high-definition video conference system of claim 1, wherein the first instant-messaging application communicates with the second instant-messaging application via an instant-messaging server through the network.

7. The high-definition video conference system of claim 1, wherein the first data processing module also transmits data via the first instant-messaging application, and the second data processing module also receives the data via the second instant-messaging application through the network.

8. The high-definition video conference system of claim 1, wherein the first data processing module also transmits a plurality of audio signals via the first instant-messaging application, and the second data processing module also receives the plurality of audio signals via the second instant-messaging application through the network.

9. The high-definition video conference system of claim 1, wherein each of the first and the second instant-messaging applications is one selected from a group consisting of AOL Instant Messenger, Microsoft MSN Messenger, Yahoo! Messenger, ICQ, Jabber, Groove, and Sun JXTA.

10. The high-definition video conference system of claim 1, wherein the first data processing module is implemented into a computer and the first encoding module is embedded in the computer.

11. The high-definition video conference system of claim 1, wherein the first data processing module is implemented into a computer, and the image sensing module, the image signal processing module and the first encoding module are connected to a digital imaging/processing device capable of being coupled to the computer.

12. The high-definition video conference system of claim 1, wherein the decoding module is implemented into software or hardware.

13. A high-definition video conference method, comprising the steps of:
    at a first terminal, performing steps of:
        sensing an image to generate a plurality of raw digital signals;
        processing the plurality of raw digital signals into a plurality of usable digital signals;

compressing the plurality of usable digital signals under a first high-definition compression standard into a plurality of first compressed digital signals;

compressing the plurality of first compressed digital signals under a second high-definition compression standard into a plurality of second compressed digital signals; and executing a first instant-messaging application, and transmitting the plurality of second compressed digital signals via the first instant-messaging application;

and at a second terminal, performing steps of:

executing a second instant-messaging application, wherein the first instant-messaging application communicates with the second instant-messaging application through a network to establish a communication link over a wideband communication channel;

receiving the plurality of second compressed digital signals via the second instant-messaging application through the wideband communication channel;

decompressing the plurality of second compressed digital signals under the high-definition compression standard to obtain a plurality of image signals; and displaying the plurality of image signals.

14. The high-definition video conference method of claim 13, wherein the first high-definition compression standard is an H.264 standard.

15. The high-definition video conference system of claim 13, wherein the first high-definition compression standard is an MJPEG standard and the second high-definition compression standard is an H.264 standard.

16. The high-definition video conference method of claim 13, between the step of decompressing the plurality of compressed digital signals and the step of displaying the plurality of image signals, further comprising step of: selectively scaling the plurality of image signals.

17. The high-definition video conference method of claim 13, wherein the network is one selected from a group consisting of a local area network, an Intranet, an Internet, a radio telecommunication network, and a public switched telephone network.

18. The high-definition video conference system of claim 13, wherein the first instant-messaging application communicates with the second instant-messaging application via an instant-messaging server through the network.

19. The high-definition video conference method of claim 13, wherein at the first terminal, data are also transmitted via the first instant-messaging application, and at the second terminal, the data are received via the second instant-messaging application through the network.

20. The high-definition video conference method of claim 13, wherein at the first terminal, a plurality of audio signals are also transmitted via the first instant-messaging application, and at the second terminal, the plurality of audio signals are received via the second instant-messaging application through the network.

21. The high-definition video conference method of claim 13, wherein each of the first and the second instant-messaging applications is one selected from a group consisting of AOL Instant Messenger, Microsoft MSN Messenger, Yahoo! Messenger, ICQ, Jabber, Groove, and Sun JXTA.

* * * * *

UNITED STATES PATENT AND TRADEMARK OFFICE
CERTIFICATE OF CORRECTION

| | | |
|---|---|---|
| PATENT NO. | : 8,120,639 B2 | Page 1 of 1 |
| APPLICATION NO. | : 11/984729 | |
| DATED | : February 21, 2012 | |
| INVENTOR(S) | : Barry Lam et al. | |

It is certified that error appears in the above-identified patent and that said Letters Patent is hereby corrected as shown below:

On the Title page, item [75]: first named inventor's name is written incorrectly. Please correct the name to read Barry Lam.

Signed and Sealed this
Twenty-ninth Day of May, 2012

David J. Kappos
*Director of the United States Patent and Trademark Office*